Feb. 23, 1932.  T. A. E. LAKE  1,846,602
PONTOON HYDROPLANE BOAT
Filed March 13, 1931   4 Sheets-Sheet 1
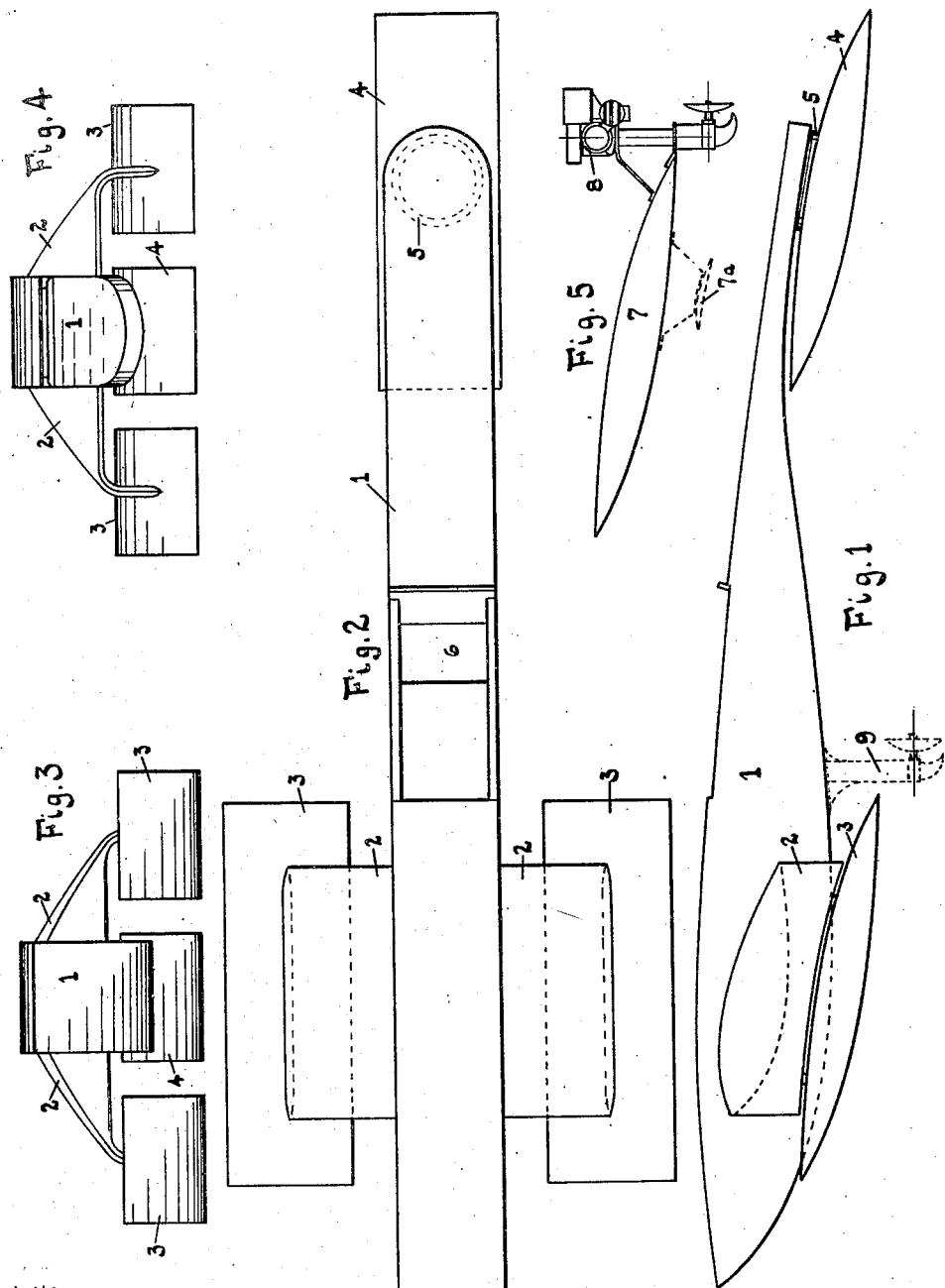

Feb. 23, 1932. T. A. E. LAKE 1,846,602
PONTOON HYDROPLANE BOAT
Filed March 13, 1931  4 Sheets-Sheet 2
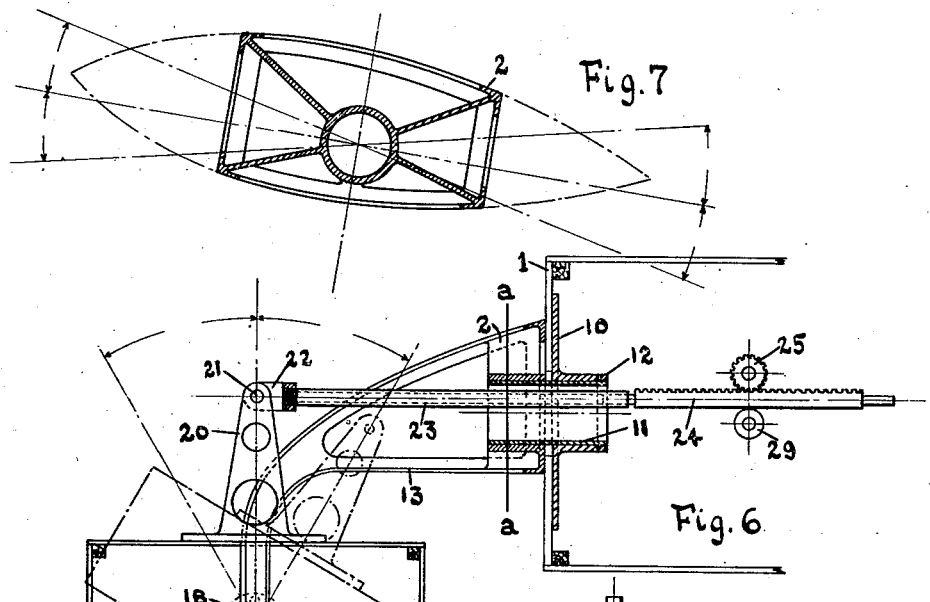
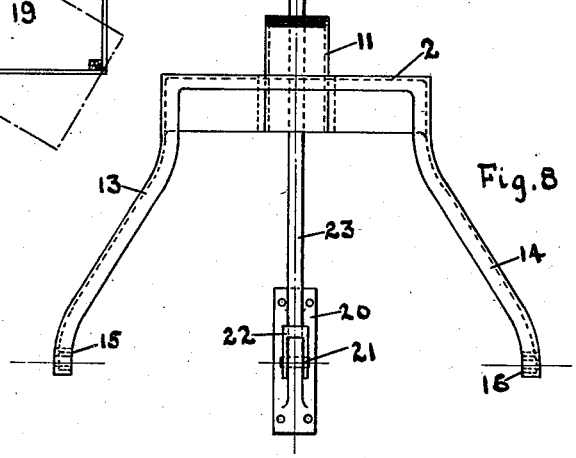
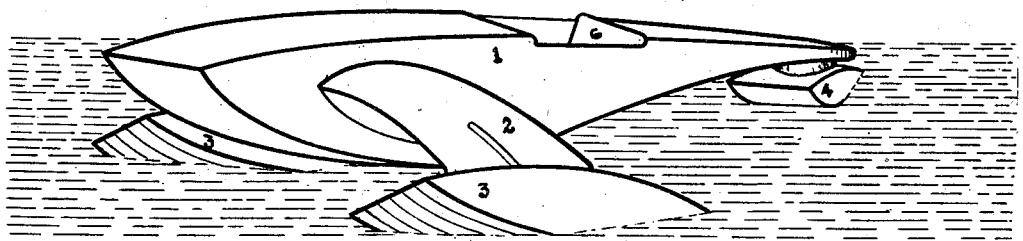
Witnesses:
Bernard E. Charter
Cecil P. Ford
INVENTOR
Thomas A. Edison Lake Feb. 23, 1932. T. A. E. LAKE 1,846,602
PONTOON HYDROPLANE BOAT
Filed March 13, 1931 4 Sheets-Sheet 3
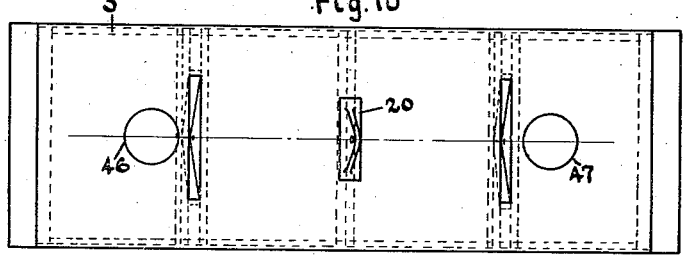
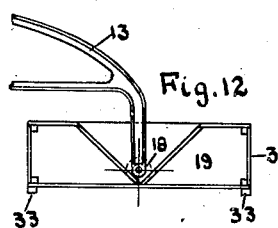
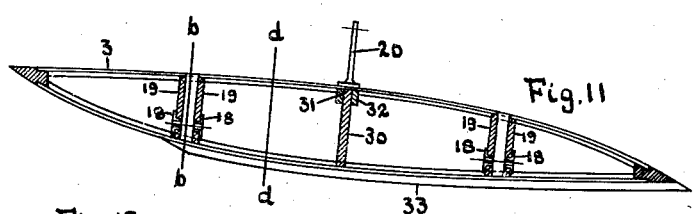
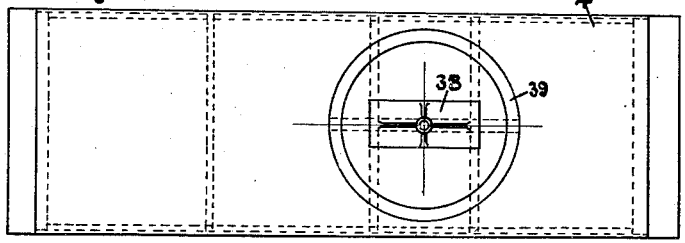
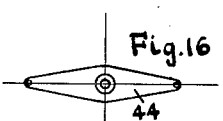
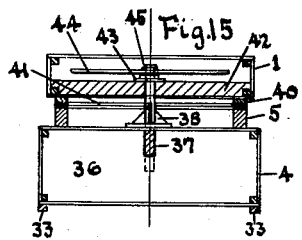
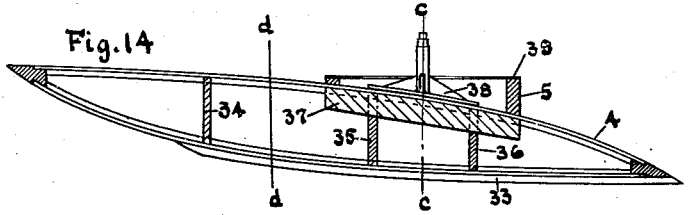
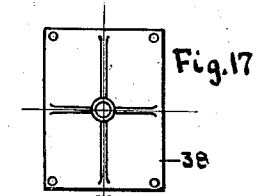
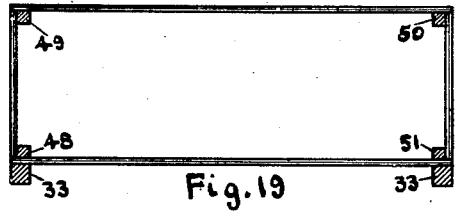
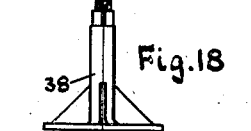
Witnesses:
Bernard E. Charter
Cecil P. Ford
INVENTOR
Thomas A. Edison Lake Feb. 23, 1932.          T. A. E. LAKE          1,846,602
PONTOON HYDROPLANE BOAT
Filed March 13, 1931    4 Sheets-Sheet 4

Witnesses:
Bernard E. Charter
Cecil P. Ford

INVENTOR
Thomas A. Edison Lake

Patented Feb. 23, 1932

1,846,602

UNITED STATES PATENT OFFICE

THOMAS A. EDISON LAKE, OF MILFORD, CONNECTICUT

PONTOON-HYDROPLANE BOAT

Application filed March 13, 1931. Serial No. 522,473.

The object of this invention is to provide a type of boat which is capable of skimming over the surface of the water at high speed and be able to make small radius turns at high speed without "skidding" and maintain its stability at all times.

I attain these results, first, by separating the buoyant portion of the structure into separate sustaining or buoyant units forming pontoon-hydroplanes, arranged so as to provide a three-point support for the body or framework to which the pontoon-hydroplanes are attached, and secondly, by providing means for varying the planing angle of the pontoon-hydroplanes and being able to tilt or "bank" one set and steering with another.

The invention consists in the peculiar and novel features of construction, combination and arrangement of parts as will be hereinafter fully described and then claimed.

Figure 20:
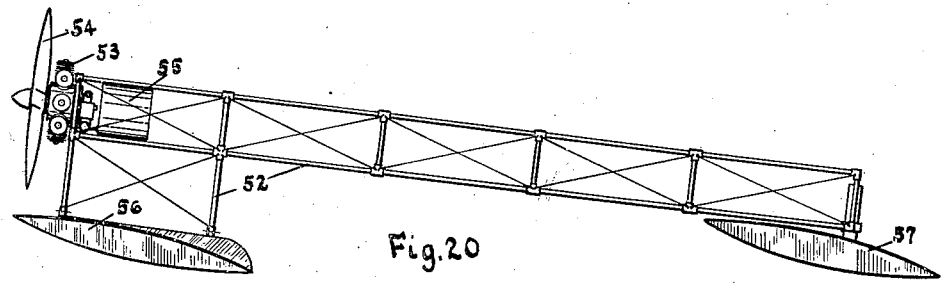
Figure 21:
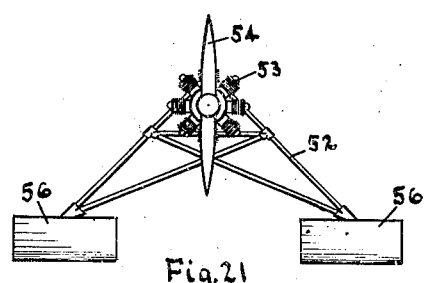
Figure 22:
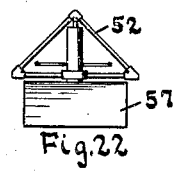
Figure 24:
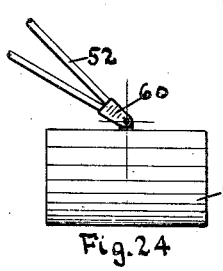
Figure 23:
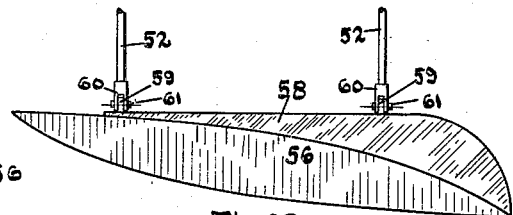
Figure 25:
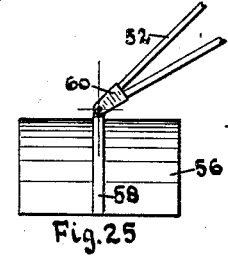
Figure 26:
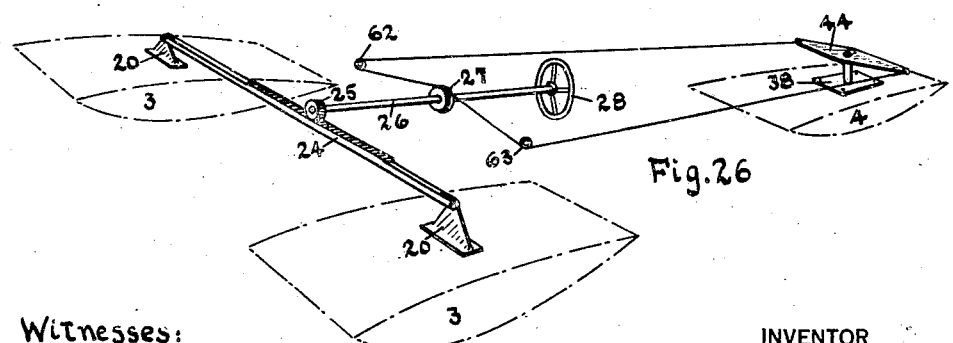

In the drawings, illustrating the invention, in the several figures of which like parts are similarly designated, Fig. 1 is a side elevation of my pontoon-hydroplane boat. Fig. 2 is a plan view of same. Fig 3 is a front elevation. Fig. 4 is a rear elevation. Fig. 5 is a pontoon-hydroplane with an outboard motor attached as a propelling means. Fig. 6 is a sectional view through a portion of the body showing the means for attaching and operating the pontoon-hydroplanes. Fig. 7 is a vertical section drawn on the line a—a of Fig. 6. Fig. 8 is a plan view of the frame, lever and bracket shown in Fig. 6. Fig. 9 is a diagrammatic sketch showing the forward pair of pontoon-hydroplanes tilted or "banked" and the rear pontoon-hydroplane turned as when making a short radius turn at high speed. Fig. 10 is a plan view of one of the forward (tilting) pontoon-hydroplanes. Fig. 11 is a longitudinal section of Fig. 10. Fig. 12 is a transverse section drawn on the line b—b of Fig. 11. Fig. 13 is a plan view of the rear (steering) pontoon-hydroplane. Fig. 14 is a longitudinal section of Fig. 13. Fig. 15 is a transverse section drawn on the line c—c of Fig. 14 and including a section through the body illustrating the means for steering. Fig. 16 is a plan view of the steering yoke. Fig. 17 is a plan view (enlarged) of the steering spindle bracket. Fig. 18 is a front elevation of Fig. 17. Fig. 19 is an enlarged cross section of the pontoon-hydroplanes drawn on the line d—d of Figs. 11 and 14. Fig. 20 illustrates the use of an aeroplane engine and propeller as a driving means and the use of a framework in place of the body shown in Fig. 1. Fig. 21 shows the front end of Fig. 20. Fig. 22 shows the rear cross member of the framework and supporting means for the rear pontoon-hydroplane of Fig. 20. Figs. 23, 24 and 25 show enlarged side, front and rear views of the forward (tilting) pontoon-hydroplanes and means for attaching same to the framework shown in Fig. 20. Fig. 26 is a diagrammatic illustration of the steering and tilting or "banking" mechanism.

In Figs. 1, 2, 3 and 4, 1 is the body of the boat or water vehicle to which are pivotally attached the streamlined brackets 2, to which are hinged or pivoted the pontoon-hydroplanes 3. Rotatably pivoted at the rear of the body 1 is a pontoon-hydroplane 4 having a turning ring 5. The body 1 would be built with water-tight compartments and an open space providing a seat 6 for the operator. (Control and steering mechanism is not shown in Figs. 1, 2, 3 and 4.) In Fig. 5, 7 represents a pontoon-hydroplane which may be the same as those shown in Figs. 1, 2, 3 and 4 which are designated by 3 and 4, having an outboard motor 8 mounted upon and attached to the rear edge of the pontoon-hydroplane, providing a propelling unit or units. The outboard motors may be of the usual type or special motors with fuel tanks within the body and controlled from the operator's seat. Instead of using outboard motors as shown in Fig. 5, a motor or motors may be installed within the body driving through an arrangement of gears to a propelling unit or units 9 shown by dotted lines in Fig. 1.

In Figs. 6, 7 and 8 is shown a partial transverse section of the body 1 to which is secured a large bearing flange 10 rotatably supporting a sleeve 11 to which is secured the pontoon-hydroplane supporting frame bracket 2, which may be enclosed in a stream-lined covering of metal or other material presenting a shape similar to that shown in Figs. 1, 2, 3 and 4. The sleeve 11 is fastened to the bracket 2 by rivets (not shown) and is threaded on the other end to receive a threaded collar 12. In place of the collar 12 a gear or lever can be secured with means for varying the angle of the frame bracket 2 as indicated by the center-line positions shown in Fig. 7. It is understood that means will be provided for locking the brackets 2 in any desired position and that resilient means may be provided, such as springs, hydraulic or pneumatic devices, to permit a slight resilient movement to take up shocks between the pontoon-hydroplanes and the body to which they are attached. Forming a part of the bracket 2 are arms 13 and 14, at the ends of which are bearings 15 and 16 which support the pontoon-hydroplanes 3 by means of pins 17 in flange bearings 18 which are secured to bulkheads 19. This arrangement permits tilting or "banking" the pontoon-hydroplanes 3 to the right or left. The dot and dash portion of Fig. 6 indicates one of the pontoon-hydroplanes in a tilted or "banked" position. Attached to the top of the pontoon-hydroplane 3 over a reinforced center bulkhead is the tilting bracket or lever 20. Attached to the lever 20 by pin 21 is the yoke 22 into which is threaded a pipe or tube 23 which is secured to the gear rack 24 in mesh with the gear 25. The gear 25 is keyed to a shaft 26, to which is also secured a drum 27 and a steering wheel 28 (see Fig. 26). 29 is a roller which keeps the gear 25 in mesh with the gear rack 24. The gear 25 and the roller 29 will be carried in a bearing (not shown) permitting a vertical movement when the pontoon-hydroplanes are tilted or "banked" off center. It is understood that the same arrangement of parts shown in Figs. 6, 7 and 8 (with the exception of the rack 24, the gear 25 and the roller 29) would be duplicated on the other side of the body 1. Fig. 9 is a sketch showing how the two forward (tilting) pontoon-hydroplanes would be tilted or "banked" and the rear pontoon-hydroplane turned, like a rudder, when the boat is being steered to the right. In Figs. 10, 11 and 12, 3 represents one of the forward (tilting) pontoon-hydroplanes, having bulkheads 19 with flange bearings 18. The center bulkhead 30 with reinforcing strips 31 and 32 is directly below the tilting bracket or lever 20. Runners 33 may be fastened as shown and act as keels to prevent side-slipping when making turns. With the exception of the wells between the bulkheads 19, the pontoon-hydroplanes are water-tight. Hand-holes 46 and 47 with covers will be provided to permit access to the end compartments for inserting the pins 17 in the flange bearings 18. Figs. 13, 14, 15, 16, 17 and 18 show the rear pontoon-hydroplane 4 and means for rotatably connecting same to the body 1, and in which 34, 35 and 36 are transverse bulkheads. 37 is a fore and aft member recessed into the bulkheads 35 and 36. The bulkheads 35 and 36 with the member 37 provide fastening and supporting means for the ring 5 and the steering spindle plate 38. Fastened to the wooden ring 5 is a flat metal ring 39. In Fig. 15 a cross section through the body 1 is shown with a wooden ring 40 and flat metal ring 41 attached. 42 is a beam through which the steering spindle 38 passes. 43 is a flange bearing secured to the beam 42. 44 is the steering yoke which is keyed to the steering spindle and held in place by a nut 45. Fig. 19 is an enlarged cross section of the pontoon-hydroplanes 3 and 4 drawn on the line d—d. The top, bottom and sides are made of ply-wood. 48, 49, 50 and 51 are fore and aft stringers. The pontoon-hydroplanes would be built of strong light materials and fastened together with waterproof glue and brass screws. However, I do not limit the construction to such materials. The entire construction may be of metal.

Figs. 20, 21, 22, 23, 24, 25 represent an arrangement in which the body is made up of tubing into a framework 52 braced with wire. The propelling means consists of an aeroplane engine 53 and a propeller 54 with a fuel tank 55, forward (tilting) pontoon-hydroplanes 56 and a rear (steering) pontoon-hydroplane 57.

In Fig. 23, 58 is a fin rigidly fastened to the pontoon-hydroplane 56 and to which eyes 59 are secured. The yokes 60 are connected to the eyes 59 by the pins 61. It will be noted that the forward end of the pontoon-hydroplane 56 tilts on a smaller radius than the rear end, giving a steering effect as well as tilting or "banking". In other words, the rear end will swing out further than the front end when making turns.

Fig. 26 is a diagrammatic arrangement illustrating the operation of the tilting or "banking" mechanism and steering means. The dot and dash portions represent the pontoon-hydroplanes 3 and 4, which would be supported as previously specified, the forward ones so that they may be tilted or "banked" and the rear one so that it may be steered or turned like a rudder. The gear rack 24 is shown as a continuous bar connected to both of the tilting levers 20, which are secured to the pontoon-hydroplanes. The gear 25 would be keyed to the shaft 26 as would the drum 27 and the steering wheel 28. The steering yoke 44 which is keyed to the steering spindle 38 would be connected by wires to the drum 27 over pulleys 62 and 63. Suitable bearings would be provided for the shaft 26. Turning the steering wheel 28 to the right would turn the rear pontoon-hydroplane to the right and at the same time, through the rack 24 and the gear 25, tilt or "bank" the forward pontoon-hydroplanes to the left. This would be the position of the pontoon-hydroplanes when making a left hand turn, which is opposite to that shown in Fig. 9. A worm and worm wheel may be used to operate the gear 25 to relieve the operator from having to hold the pontoon-hydroplanes in a tilted or "banked" position. Other arrangements of operating mechanism may be used in place of that shown in the drawings, capable of accomplishing the same results.

While in the various drawings I have shown arrangements of three pontoon-hydroplanes, I do not limit myself to this number, since other multiples may be used. The steering pontoon-hydroplane could be placed forward and the tilting pontoon-hydroplanes could be arranged aft. However, I believe the arrangement of three as shown would be the best since it provides three-point support and contact with the surface of the water. The pontoon-hydroplanes could be built with a step instead of the single planing surface.

The main features of this invention are the use of the water-tight buoyant pontoon-hydroplanes with means for varying their angles of incidence, tilting or "banking" them when making turns and means for steering. By using outboard motors and setting them at an angle to exert a lifting as well as a forward propelling force, it is believed the boat as a whole would plane and skim over the surface of the water at high speed. By tilting or "banking" the forward set of pontoon-hydroplanes and steering with the rear one, turns could be made at high speed without "skidding" or side-slipping.

By separating the buoyant portion of the boat into three separate buoyant planing units, greater stability will be secured and the boat as a whole will be more sea-worthy, capable of being driven at speed on rough water, such as is not possible with single hull hydroplane boats. In actual tests these claims have been demonstrated. The boat maintains an even keel at all speeds, skims the surface of the water, planing on the rear edges of the pontoon-hydroplanes and will not tip or turn over when making turns at high speed and it can be completely turned around in its own length.

By adding a non-buoyant hydroplane to each of the buoyant hydroplanes as indicated by the dotted portion 7a of Fig. 5, additional planing surface will be provided and cause the buoyant hydroplanes to ride above the surface of the water at high speeds.

What I claim is:

1. A boat or water vehicle, comprising buoyant planing surfaces, means for adjusting said buoyant planing surfaces about substantially longitudinal and lateral axes, means for propelling and means for steering said boat or water vehicle.

2. A hydroplane boat, comprising a plurality of buoyant hydroplanes, means for tilting said buoyant hydroplanes about their lateral axes and means for tilting said buoyant hydroplanes about their longitudinal axes in combination with means for steering.

3. A hydroplane boat, comprising a body, propelling means, steering means, adjustable planing surfaces arranged to the right and left of the longitudinal center of the body, means for adjusting said planing surfaces to provide lateral thrust to either the right or the left as well as vertical thrust for support.

4. A water vehicle, comprising a plurality of buoyant hulls or floats, propelling means, steering means, and means for laterally tilting said buoyant hulls or floats to prevent skidding when making turns.

5. A hydroplane boat having adjustable planing surfaces, resilient means, propelling means, steering means, means for varying the angle of the planing surfaces about lateral axes for purposes of vertical thrust and support, and means for varying the angle of said planing surfaces about longitudinal axes for purposes of lateral thrust to assist in steering and to prevent skidding.

6. A water vehicle, comprising a body supported by buoyant planing surfaces, propelling means, steering means, cushioning means, and means for adjusting the buoyant planing surfaces about longitudinal and lateral axes.

7. A water vehicle, comprising a body or framework, a buoyant hydroplane hull arranged forward on each side of the body or framework, a third buoyant hydroplane hull arranged at the rear of the body or framework, means for varying the planing angle of the buoyant hydroplane hulls, means for laterally tilting the forward set of buoyant hydroplane hulls and means for steering the rear buoyant hydroplane hull.

8. A water vehicle, comprising a body and propelling means buoyant hydroplanes adjustably attached to and supporting the body, means for varying the planing angle of the buoyant hydroplanes, means for laterally tilting the buoyant hydroplanes and means for steering.

9. A water vehicle, comprising a body, buoyant hydroplanes adjustable attached to and supporting the body, propelling means attached to each of the buoyant hydroplanes, means for varying the planing angle of each of the buoyant hydroplanes, means for laterally the said buoyant hydroplanes and means for steering.

10. A water vehicle, comprising a body or main hull, buoyant hydroplanes adjustably attached to said body or main hull, propelling means attached to said buoyant hydroplanes, means for adjusting and controlling the planing angle of said buoyant hydroplanes, means for laterally tilting said hydroplanes in combination with steering means.

11. A boat or water vehicle, comprising a body supported above the water by buoyant hydroplanes, means for tilting said buoyant hydroplanes about their longitudinal axes, means for tilting said buoyant hydroplanes about their lateral axes and means for propelling and steering said boat or water vehicle.

12. A hydroplane boat comprising a hull, a buoyant hydroplane adjustably attached to each side of the hull forward of its longitudinal center, a buoyant hydroplane adjustably attached to the hull aft of the longitudinal center, means for laterally tilting the two side buoyant hydroplanes in combination with means for steering the after buoyant hydroplane.

13. A pontoon-hydroplane boat comprising a body, buoyant pontoon-hydroplanes adjustably attached to the body and supporting same above the surface of the water, propelling means operated by a motor or motors carried by or within the body or directly attached to the buoyant pontoon-hydroplanes, means for varying and adjusting the planing angle of said buoyant pontoon-hydroplanes and means for laterally tilting the buoyant pontoon-hydroplanes in combination with steering means.

14. A hydroplane boat comprising a body or main hull, buoyant hydroplanes adjustably attached to said body or main hull, propelling means attached to said buoyant hydroplanes, means for adjusting the buoyant hydroplanes and means for steering.

15. A water vehicle comprising a body, buoyant hydroplane hulls adjustably attached to said body, propelling means attached to said buoyant hydroplane hulls, under-water vanes or hydroplanes attached to the bottoms of the said buoyant hydroplane hulls, means for varying the angles of relationship between the buoyant hydroplane hulls and the surface of the water and means for steering.

16. A multi hydroplane boat comprising three water-tight buoyant hydroplanes adjustably attached to and providing a three-point support for a body or main hull, propelling means, means for varying the planing angle and laterally tilting the buoyant hydroplanes together with means for steering.

17. A hydroplane boat comprising a body or main hull, a forward set of two buoyant hydroplanes adjustably attached to each side of the body or main hull, a buoyant hydroplane adjustably attached to the rear of the body or main hull, all of said buoyant hydroplanes capable of planing upon the surface of the water and supporting the body or main hull above the surface of the water, means for laterally tilting the forward set of buoyant hydroplanes and steering with the rear buoyant hydroplane, propelling means supported by the body or main hull or directly attached to each of the buoyant hydroplanes.

18. A hydroplane boat comprising a body or main hull, buoyant hydroplanes adjustably attached to the body or main hull, non-buoyant hydroplanes attached to and beneath the buoyant hydroplanes, propelling means to cause the buoyant hydroplanes to skim the surface of the water at moderate speeds and to support the body and buoyant hydroplanes above the surface of the water upon the non-buoyant hydroplanes at high speeds, means for adjusting the buoyant hydroplanes and means for steering.

19. A pontoon-hydroplane boat comprising a body or main hull, buoyant pontoon-hydroplanes attached to said body or main hull, propelling means directly attached to each of the buoyant pontoon-hydroplanes and means for adjusting the pontoon-hydroplanes and steering.

20. A boat or water vehicle, comprising a body supported by buoyant planes, means for propulsion, means for steering, means for tilting the said buoyant planes about a horizontal longitudinal axis, means for tilting the said buoyant planes about a horizontal lateral axis and means for jointly tilting the said buoyant planes in combination with means for steering.

In testimony whereof I have hereunto set my hand this 5th day of March, 1931.

THOMAS A. EDISON LAKE.